United States Patent [19]
Muschalek

[11] 4,363,431
[45] Dec. 14, 1982

[54] PICKUP TRUCK SPARE TIRE RACK

[76] Inventor: Ben E. Muschalek, Box 198, McCamey, Tex. 79752

[21] Appl. No.: 263,345

[22] Filed: May 12, 1981

[51] Int. Cl.³ .............................................. B62D 43/04
[52] U.S. Cl. ................................ 224/42.23; 224/42.21
[58] Field of Search ............... 224/42.23, 42.21, 42.24, 224/42.25, 42.27, 42.28, 42.29

[56] References Cited

U.S. PATENT DOCUMENTS

| | | | |
|---|---|---|---|
| 1,589,955 | 6/1926 | Green | 224/42.23 |
| 1,913,835 | 6/1933 | Golike | 224/42.23 X |
| 2,417,952 | 3/1947 | Selzer et al. | 224/42.23 X |
| 4,282,995 | 8/1981 | Austin | 224/42.23 |

Primary Examiner—Steven M. Pollard
Attorney, Agent, or Firm—Harvey B. Jacobson

[57] ABSTRACT

An elongated horizontal tire support member having first and second ends is disposed beneath the rear of an associated vehicle chassis including opposite side longitudinal frame members and each end of the support members has an upstanding bore formed therethrough. An upstanding bolt is passed, loosely, upwardly through each of the bores and includes a threaded upper end. One of the threaded upper ends is removably threadedly supported from one longitudinal side portion of the frame and the other frame side portion includes a vertically disposed flange having a generally horizontal smooth bore formed therethrough which parallels the tire support. A mounting member is provided and includes horizontal and vertical flange portions. The mounting member horizontal flange portion has a threaded bore formed therethrough through which the upper end of the other bolt is threadedly supported from the vertical flange of the mounting member has a threaded bore formed therethrough and is receivable inwardly of the vertical flange carried by the other side frame member. A threaded fastener shank is passed through the smooth bore and removably threaded in the threaded bore formed in the upstanding and vertical flange of the mounting member. The outer end of the shank includes a head with which a rotary input torque tool may be operatively engaged to rotate the shank in either direction.

8 Claims, 3 Drawing Figures

PICKUP TRUCK SPARE TIRE RACK

BACKGROUND OF THE INVENTION

Various forms of underframe spare tire racks heretofore have been provided on pickup trucks and other vehicles including opposite side frame members between which a spare tire may be received, but most of these previously known forms of tire racks are constructed in a manner which makes the removal of a spare tire and wheel therefrom difficult and further makes the replacement of a spare tire or wheel thereon difficult.

Further, while improved spare tire racks having considerable structure in addition to that structure which is usually associated with an inexpensive original equipment spare tire rack heretofore have been provided and these more complex tire racks may have a spare tire and wheel removed or replaced thereon with less effort than that associated with originally equipment spare tire racks, these improved forms of tire racks, due to the considerable additional structural members and features thereof are for the most part prohibited from an economic standpoint. Accordingly, a need exists for an improved simplified form of tire rack.

Examples of various different forms of tire racks including some of the general structural and operational features of the instant invention are disclosed in U.S. Pat. Nos. 2,958,450, 3,175,742, 3,187,914, 3,904,093, 4,060,171 and 4,238,091.

BRIEF DESCRIPTION OF THE INVENTION

The spare tire rack of the instant invention utilizes only one L-shaped bracket, one L-shaped retaining mount and a threaded fastener in addition to the conventional simplified form of spare tire rack provided on most pickup trucks and other similar vehicles. However, the addition of these three relatively inexpensive components improve the mode of operation of the conventional tire rack to the extent that its use if greatly facilitated by a considerable reduction in the effort required to remove a spare tire and wheel from the rack and to replace a spare tire and wheel on the rack.

The main object of this invention is to provide an improved form of inexpensive spare tire rack which may be utilized on conventional pickup trucks and other similar vehicles.

Another object of this invention is to provide an improved spare tire rack by an inexpensive addition to existing original equipment tire racks and which may therefore be not only incorporated into the manufacture of new pickup trucks and other similar vehicles, but which may also be used to retrofit existing pickup trucks and other similar vehicles in accordance with the present invention.

A final object of this invention to be specifically enumerated herein is to provide a pickup truck spare tire rack in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
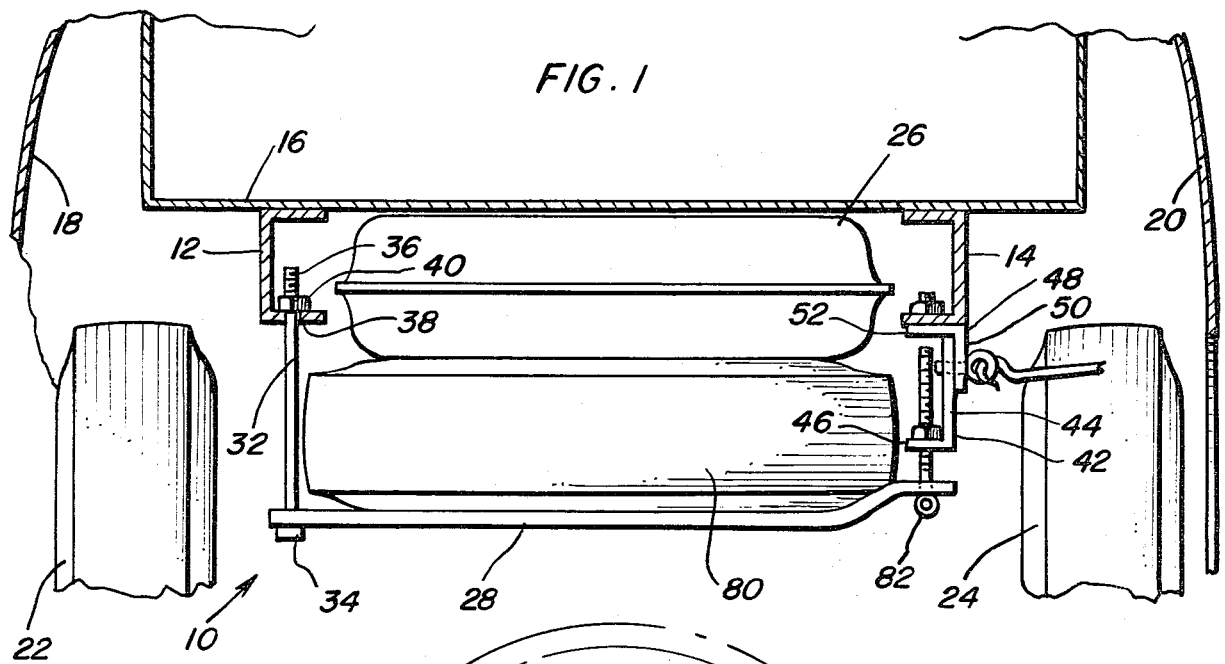
FIG. 1 is a fragmentary transverse vertical sectional view of the rear portion of a conventional form of pickup truck or other similar vehicle illustrating the improved spare tire rack of the instant invention operatively associated therewith.
Figure 2:
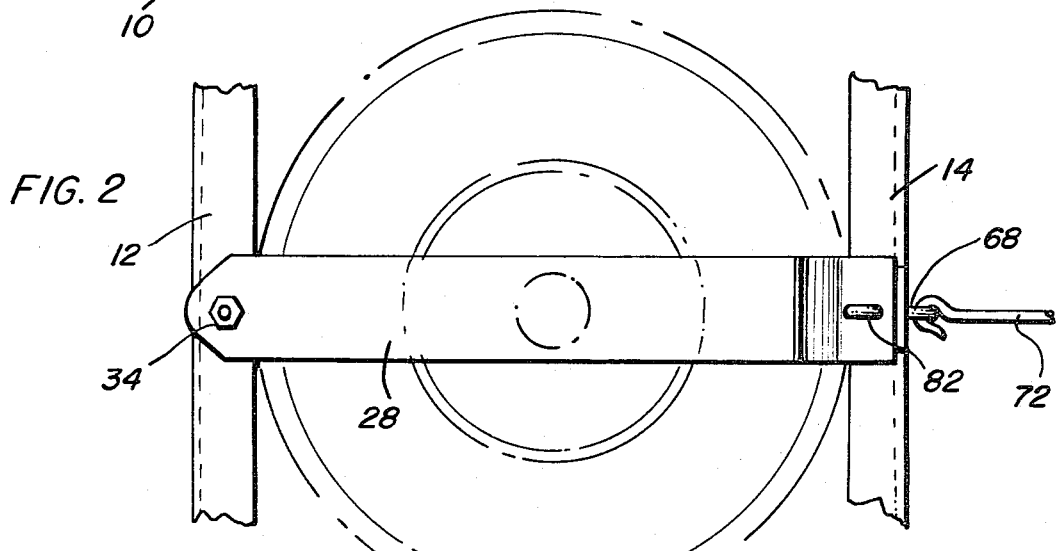
FIG. 2 is a fragmentary bottom plan view of the tire rack illustrated in FIG. 1.

Referring now more specifically to the drawings, the numeral 10 generally designates a pickup truck including opposite side longitudinal frame members 12 and 14 supporting a load bed 16 therefrom including opposite side fender portions 18 and 20. The rear of the truck 10 is supported by a pair of opposite side wheels 22 and 24 journalled from opposite ends of an axle assembly (not shown) mounted beneath the load bed 16 and the vehicle 10 further includes a fuel tank 26 mounted between the longitudinal frame members 12 and 14.

An elongated tire support member 28 is provided and extends horizontally beneath and transversely of the longitudinal frame members 12 and 14. The opposite ends of the tire support member 28 include upstanding bores 30 formed therethrough and a first long upstanding bolt 32 is passed upwardly through the bore 30 formed in the left-hand side of the tire support member 28 as illustrated in FIG. 1 of the drawings with the tire support member 34 supported by the head 34 of the bolt 32. The upper end of the bolt 32 is threaded as at 36 and is passed through a smooth bore 38 formed in the longitudinal frame member 12. In this manner, the left end of the tire support member 28 may be supported from the frame member 12 for vertical adjustment relative thereto. Actually, the upper threaded end of the bolt 36 is illustrated as having a threaded nut 40 engaged therewith and disposed above the portion of longitudinal frame member 12 through which the bore 38 is formed. Alternately, a nut-type clip may be clip engaged with the lower portion of the longitudinal frame member 12 and the upper threaded end 36 of the bolt 32 is passed through the bore 38 and threadedly engaged with the clip.

Conventionally, the right-hand end of the tire support member illustrated in FIG. 1 is supported from the right-hand longitudinal frame member 14 in substantially the same manner, the lower ends of the bolts secured upwardly through the ends of the tire support member 28 being loosely received through the opposite end bores formed in the tire support member. However, the instant invention utilizes a generally L-shaped mounting member 42 including a vertical flange 44 and a horizontal flange 46. In addition, an L-shaped bracket 48 is provided including a vertical flange 50 and a horizontal flange 52. The horizontal flange 52 has a vertical bore 54 formed therethrough and an upstanding fastener 56 is secured upwardly through the bore 54 and the bore 38 formed in the right-hand longitudinal frame member 14 by a threaded nut 58 threadedly engaged with the upper end of the fastener 56. The fastener 56 and nut 58 securely anchor the bracket 48 to the longitudinal frame member 14, the vertical flange 50 having a smooth horizontal bore 60 formed therethrough.

The horizontal flange 46 of the mounting member 42 has a vertical smooth bore 62 formed therethrough and the vertical flange 44 of the mounting member 42 has a threaded bore 64 formed therethrough. A short threaded shank-type fastener 66 is provided and passed through the bore 60 from the outer side of the vertical flange 50 and is threadedly engaged in the threaded bore 64, the outer end of the fastener 66 having an I-head 68 formed thereon with which the hooked end 70 of an elongated rotary torque input tool 72 may be releasably engaged. The upper end of a somewhat shortened bolt 74 passed upwardly through the bore 30 in the right-hand end of the tire support member 28 is passed upwardly through the smooth bore 62 and secured upwardly therethrough by a threaded nut 76 engaged with the bolt 74. Conversely, the nut 76 may be replaced by a clip-type nut clip engaged with the horizontal flange 46 in registry with the bore 42. Also, the nuts 40 and 76 may be spot welded or otherwise secured to the corresponding horizontal flange portions.

Figure 3:
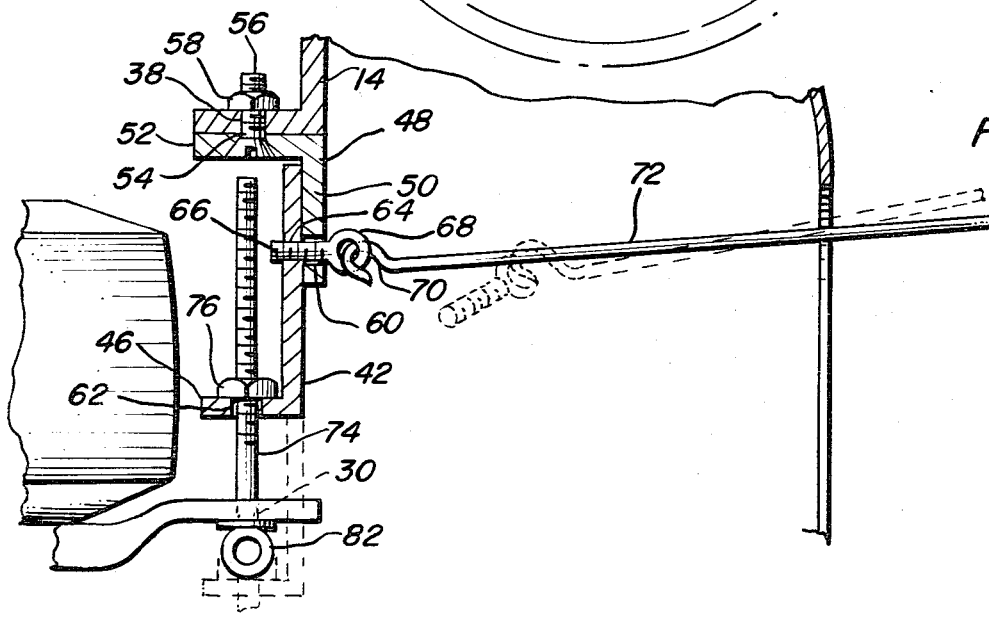
FIG. 3 is an enlarged fragmentary transverse vertical sectional view of the components of the tire rack which constitute the improvements therein over a conventional original equipment tire rack.

By utilizing the mounting member 42 and the bracket 48, the right-hand end of the tire support member 28 may be readily lowered through the utilization of the tool 72 from the outer side of the vehicle 10 in the manner illustrated in FIG. 3 of the drawings. Upon disengagement of the fastener 66 from the threaded bore 64, the right-hand end of the tire support member 28 and the mounting member 42 may be lowered. Once the right-hand end of the tire support member has been lowered, the spare tire 80 supported therefrom may be removed. Conversely, when it is desired to replace the spare tire 80, it is placed on the tire support member 28 while the right-hand end thereof is lowered and the left-hand thereof is secured in an elevated position. Thereafter, the right-hand end of the tire support member 28, the bolt 74 and the mounting member 42 are raised by one hand into position with the bore 48 registered with the bore 60 after which the other hand of the user may insert the fastener 68 through the bore 60 and begin its threaded engagement into the bore 64. Subsequently, the tool 72 may be engaged with the head 68 in order to finally secure the tire rack in the operative position. Of course, each of the bolts 32 and 74 may be adjusted according to the width of the spare tire 80. Also, the lower end of the bolt 74 includes an I-shaped head 82 with which the tool 72 may be engaged. In some instances, it is desired to loosen the bolt 74 immediately prior to lowering of the right-hand side of the tire support member 28 so that the bolt 74 may again be tightened after the fastener 66 has been installed. In this manner, the spare tire 80 may be drawn upwardly tightly against the underside of the fuel tank 26.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle chassis including rear opposite side portions, an elongated horizontal tire support member having first and second ends, each end of said support member having upstanding bores formed therethrough, an upstanding bolt passing loosely upwardly through each of said bores and including a threaded upper end, one of said threaded upper ends being removably threadingly supported from one of said side portions, the lower ends of said bolts including enlarged abutments upwardly abuttingly engaged with downwardly facing surfaces of said ends of said support member, the other side portion including first upright flange disposed transverse to said support member and having a generally horizontal smooth bore formed therethrough generally paralleling said tire support member, a mounting member, the other threaded upper end being threadedly supported from said mounting member, said mounting member including a second upstanding flange generally paralleling and disposed closely inwardly of said first flange, said second flange having a threaded horizontal bore formed therein registered with said smooth bore, and a threaded fastener shank passed through said smooth bore from the outside of said first flange and removably threaded in said threaded bore.

2. The combination of claim 1 wherien said bolts include rotary torque input tool engageable heads on the lower ends thereof.

3. The combination of claim 1 wherein said threaded fastener shank includes a rotary torque input tool engageable head on the outer end thereof.

4. The combination of claim 1 wherein said mounting member includes a horizontal flange having an upstanding bore formed therethrough, a nut supported from said horizontal flange, said other threaded upper end being threadedly engaged with said nut.

5. The combination of claim 1 wherein said one side portion includes a horizontal flange having an upstanding bore formed therein, a nut supported from the last mentioned horizontal flange, said one threaded upper end being threadingly engaged with the last mentioned nut.

6. The combination of claim 5 wherein said mounting member includes a horizontal flange having an upstanding bore formed therethrough, a nut supported from said horizontal flange, said other threaded upper end being threadedly engaged with said nut.

7. The combination of claim 6 wherein said bolts include rotary torque input tool engageable heads on the lower ends thereof.

8. The combination of claim 7 wherein said threaded fastener shank includes a rotary torque input tool engageable head on the outer end thereof.

* * * * *